United States Patent [19]
Scoggin

[11] 3,956,060
[45] May 11, 1976

[54] REMOVAL OF REACTION DILUENT FROM POLY(ARYLENE SULFIDE) REACTION SLURRY

[75] Inventor: Jack S. Scoggin, Bartlesville, Okla.

[73] Assignee: Phillips Petroleum Company, Bartlesville, Okla.

[22] Filed: May 3, 1974

[21] Appl. No.: 466,662

Related U.S. Application Data

[63] Continuation of Ser. No. 214,036, Dec. 30, 1971, abandoned.

[52] U.S. Cl. .................... 159/47 R; 159/2 MS; 159/16.5; 203/88; 203/96; 260/79
[51] Int. Cl.² .......................................... B01D 1/00
[58] Field of Search ........... 159/2, 16, 47; 203/88, 203/92, 95, 96; 260/79, 79.1

[56] References Cited
UNITED STATES PATENTS

| | | | |
|---|---|---|---|
| 3,409,515 | 11/1968 | Baird | 159/16.5 |
| 3,478,000 | 11/1969 | Saunders | 260/79.1 |
| 3,707,528 | 12/1972 | Miles | 260/79 |
| 3,799,234 | 3/1974 | Skidmore | 159/2 E |

Primary Examiner—Norman Yudkoff
Assistant Examiner—Hiram H. Bernstein

[57] ABSTRACT

A method for the removal of substantially all of the reaction diluent from a reaction mixture containing poly(arylene sulfide) polymer, organic polar diluent, by-product alkali metal halide, and other impurities is provided by the atmospheric adiabatic expansion of the polymer slurry from about 200 pounds pressure in a transfer line to atmospheric pressure in a flash tank, the polymer being mixed at the point of pressure letdown with 200 psig steam which is reduced in pressure at the same point in the transfer line, to remove 75 to 98 percent of the reaction diluent from the flash tank as vapor. The polymer-salt-residual diluent mixture is then passed through heated blending and drying equipment into which superheated steam is flashed to remove the residual diluent. The residual polar diluent passes back through the equipment with the steam to be removed from the flash tank.

8 Claims, 1 Drawing Figure

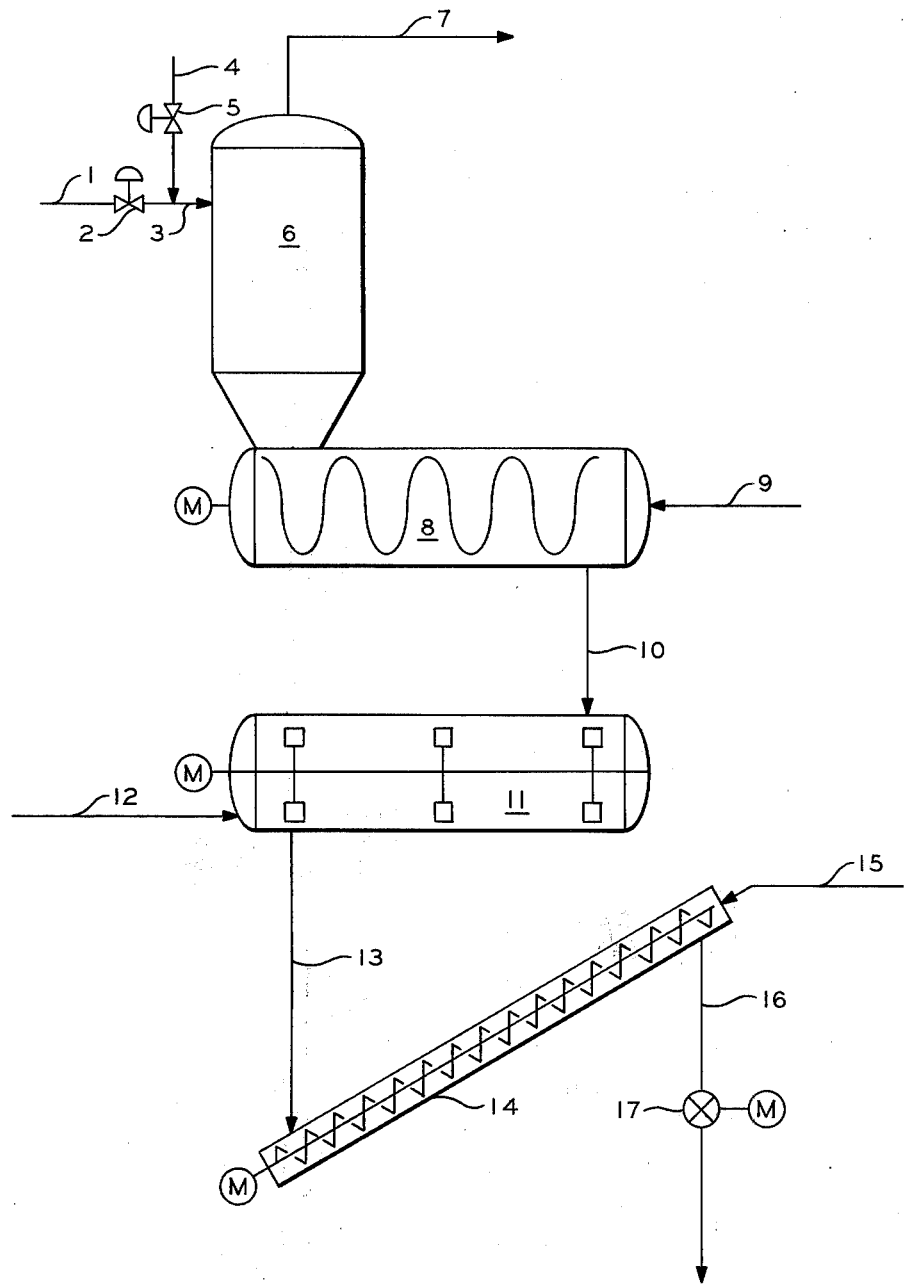

REMOVAL OF REACTION DILUENT FROM POLY(ARYLENE SULFIDE) REACTION SLURRY

This is a continuation application of my copending application having Ser. No. 214,036, filed on Dec. 30, 1971, and now abandoned.

BACKGROUND OF THE INVENTION

This invention relates to recovery of the constituents of poly(arylene sulfide) in reaction slurries. In accordance with one aspect of the invention it relates to the recovery of polar organic diluent from a poly(arylene sulfide) reaction mixture. In another aspect of the invention, it relates to the recovery of poly(arylene sulfide) from its reaction mixture. In still another aspect of the invention, it relates to the atmosphere adiabatic evaporation of diluents from a mixture of reaction mixture with steam.

In one of its concepts, the invention relates to the adiabatic atmospheric evaporation of polar organic diluent from a mixture of a reaction effluent with steam added to reduce the dew point of the reaction diluent as an aid to evaporation. In another of its concepts, the invention relates to separation of a poly(arylene sulfide) compound from its reaction mixture by evaporation of the diluent from the mixture prior to filtering in order to obtain a more readily processable particulate polymer.

A poly(arylene sulfide) must be relatively free of metal halide salts and other ash producing contaminants to be of full usefulness and value. A major problem in the production of poly(arylene sulfide) has been the recovery of high purity polymer from the contaminants in its reaction mixture. It was discovered early in the commercial production of poly(arylene sulfide) that the polar diluents usually used in polymerization processes caused difficulty in separating the polymer from its mixture by such usual means as filtration in that the diluent and polymer produces a filter cake of such "pasty" physical characteristics that plugging of the filter is a continuous problem and washing the filter cake free of other contaminants is impossible. To avoid these problems, methods have been proposed for removal of the diluent from the polymer before separation of the polymer and other contaminants is attempted. Methods of vacuum evaporation of the diluent have proved successful in separating the diluent and polymer to produce a slurry filter cake that can be reslurried and filtered to remove metal halide salts and other contaminants. It has now been found that by mixing the reaction slurry with a high pressure steam and concurrently reducing the pressure on both streams the dew point of the polar diluent can be reduced sufficiently to permit flashing of more than 75 percent of the polar diluent from the reaction slurry mixture.

Accordingly, it is an object of this invention to provide an economical method for recovering polar diluent from the reaction mixture of a poly(arylene sulfide) reaction. It is another object of this invention to provide an integrated method and apparatus for the recovery of poly(arylene sulfide) and contaminant solids free of polar diluent.

Other aspects, objects and advantages of this invention will be apparent to one skilled in the art upon studying the specification, drawing and the appended claims.

SUMMARY OF THE INVENTION

In accordance with the invention, arylene sulfide polymerization reaction mixtures are pressured from the reactor through a transfer line to a flash tank. In the transfer line the mixture is passed through a pressure reducing mechanism which reduces the pressure to atmospheric. At this same point in the transfer line, steam which had been at an elevated pressure is introduced to the transfer line at atmospheric pressure through a pressure reducing mechanism. From about 75 to about 98 percent of the polar diluent contained in the mixture is flashed with the steam through the vapor release of the flash tank. The polymer-salt-residual diluent mixture is passed into a series of heated blender-dryers into which are injected varying amounts of superheated steam which passes through the polymer mixture carrying residual polar diluent vapors with it through the vapor outlet of the flash tank. A polyphenylene sulfide polymer-salt mixture substantially free of polar diluent is recovered from the process. The polar diluent and water vapor are recovered and separated so that the polar diluent can be returned to the reaction.

It is well known that the removal of the organic polar diluent from the poly(arylene sulfide) mixtures prior to washing and removal of the wash solution results in the recovery of highly processable polymer particles with a high degree of purity. The removal of polar organic diluent from the slurry can be effected by atmospheric adiabatic evaporation in the polymer reactor itself as in the case of the batch reaction, or in a separate evaporation zone as in the case of either a batch reaction or a continuous reaction. It is presently preferred to carry out the reaction producing a mixture of high sensible heat content in a batch reaction effecting the evaporation by subjecting the slurry to an atmospheric adiabatic expansion in an evaporation zone separate from the reactor.

The process of this invention is useful with poly(arylene sulfides) generally, regardless of the method of preparation. However, the invention is especially useful with polymers prepared with the solution reaction of polyhalo compounds with metal sulfide as described in U.S. Pat. No. 3,354,129.

According to said patent poly(arylene sulfide) polymers can be prepared at high yield by reacting at least one polyhalo-substituted cyclic compound containing unsaturation between adjacent ring atoms and wherein the halogen atoms are attached to ring carbon atoms with an alkali metal sulfide in a polar organic diluent at an elevated temperature. Generally, the polar organic diluent will substantially dissolve both of the alkali metal sulfide and the polyhalo-substituted aromatic compound or other compound which can be present. The polymers produced by the process of said patent are ordinarily particulate materials and the properties of these materials will vary considerably depending upon the chosen reactants. Some are high melting thermoplastic materials having excellent high temperature stability, while others can be much lower in molecular weight, including liquids and grease-like materials. Melting point or softening point of these polymers can range all the way from liquids at 25°C. to polymers melting above 400°C.

The polyhalo-substituted compounds which can be employed as primary reactants according to said patent are represented by the formulas:

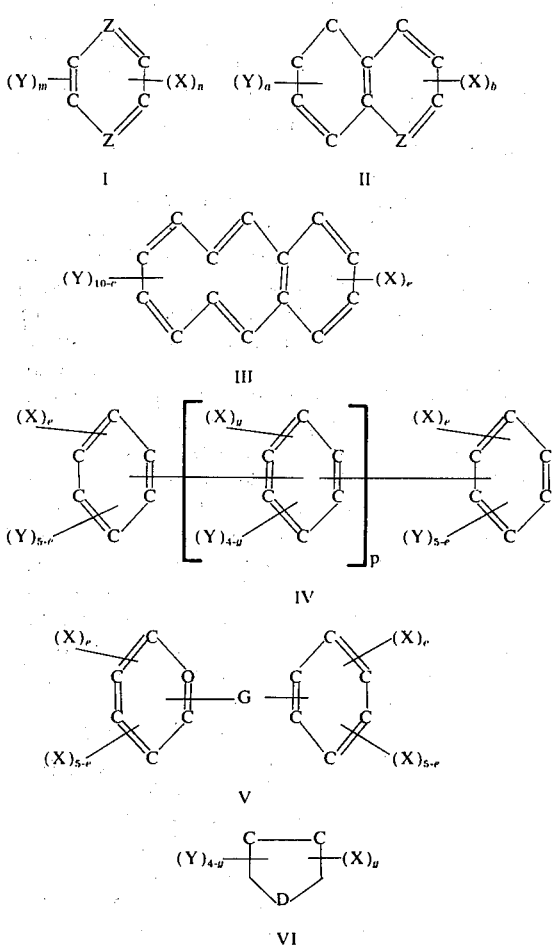

wherein each X is a halogen selected from the group consisting of chlorine, bromine, iodine, and fluorine, preferably chlorine and bromine, each Y is selected from the group consisting of hydrogen, —R, —N(R)$_2$,

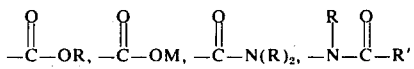

—O—R′, —S—R′, —SO$_3$H, and —SO$_3$H, wherein each —R is selected from the group consisting of hydrogen and alkyl, cycloalkyl, aryl, aralkyl, and alkaryl radicals containing from 1 to 12 carbon atoms, inclusive; each R′ is selected from the group consisting of alkyl, cycloalkyl, aryl, aralkyl and alkaryl radicals containing from 1 to 12 carbon atoms inclusive; each Z is selected from the group consisting of —N= and —C=, D is selected from the group consisting of —O—, —S—, and

G is selected from the group consisting of

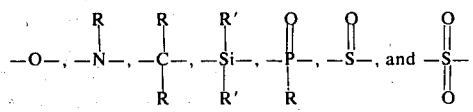

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive; $e$ is a whole integer of from 1 to 5, inclusive; $g$ is a whole integer of from 2 to 4, inclusive; and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said patent are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60–62 weight percent Na$_2$S and about 38–40 weight percent water of hydration.

The polar organic compounds which are employed as reaction media in the process of said patent should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N′-ethylene dipyrrolidone, N-methyl-2-pyrrolidone (NMP), pyrrolidone, caprolactam, N-ethylcaprolactam, sulfolane, dimethylacetamide, low molecular weight polyamides, and the like.

Some specific examples of polyhalo-substituted compounds of the above general formulas which can be employed in the process of said patent are:

1,2-dichlorobenene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4-trichlorobenzene
1,2,4,5-tetrabromobenzene
hexachlorobenzene
1-n-butyl-2,5-dichlorobenzene,
and the like.

The reactor effluent from the reaction producing arylene sulfide polymer will have a composition of about 1:1:2 of polymer:salt:polar diluent plus various impurities from the reaction. The temperature of the reactor effluent will be in the range of 450° to 600°F. and will be pressured from the reactor with steam or nitrogen at a pressure in the range of 50 to 250 psig, preferably about 200 psig.

The steam used for mixing with the polymer effluent should be superheated and be about the same pressure as the effluent before the pressure is reduced. Good results are obtained at pressure of about 200 psig for the steam. The temperature in the blending-drying equipment is maintained by jacketed heaters at a temperature sufficiently high to vaporize the polar diluent and water.

The operation of this invention can be best understood by reference to the drawing which shows a method and apparatus for removing polar diluent from a poly(arylene sulfide) reaction mixture containing arylene sulfide polymer, sodium chloride, polar diluent, and various impurities from the reaction. For purposes of illustration the operation of the invention will be described for a reaction mixture containing N-methyl pyrrolidone as the polar diluent. As stated above, other diluents can be used in the process of this invention.

Referring now to the drawing, effluent from the reactor is pressured at 200 psig to a transfer line 1 through a pressure reducing motor valve 2, where the pressure is reduced to substantially atmospheric pressure, into a transfer line 3. Superheated 200 psig steam at about 450°F. from line 4 is transferred through pressure reducing valve 5 into transfer line 3 to mix with the reaction effluent at substantially atmospheric pressure. Upon entering flash tank 6 this mixture is separated into water vapor and vaporized N-methyl pyrrolidone (NMP) which flashes overhead and out of the flash tank through line 7. Approximately 75 to 98 percent of the NMP flashes adiabatically from the flash tank 6 out to line 7.

The poly(arylene sulfide), salt, residual NMP drops into a heated ribbon blender 8 through which it is transferred with agitation countercurrent to a flow of about 0.142 pounds of steam per pound of polymer which is introduced through line 9 into the blender. This steam on mixing with the polymer carries some of the residual NMP back through the flash tank 6 and out to line 7.

The polymer and salt mixture, now further reduced in NMP content, is transferred through line 10 to a heated dryer 11 where it is further agitated while being mixed with a countercurrent flow of approximately 0.142 pounds of steam per pound of polymer which is introduced through line 12. More of the residual NMP is carried with this steam back through lines 10, the vapor space of ribbon blender 8, the flash tank 6, and out through line 7.

The polymer-salt mixture now almost depleted of NMP is passed through a heated auger conveyer 14 and agitated with a countercurrent flow of steam of about 0.07 pounds of steam per pound of polymer introduced through line 15. Here, the steam picks up the remaining NMP and passes with it back through the vapor spaces of the equipment and out through line 7. The polymer-salt mixture containing only about 0.006 pounds of NMP per pound of polymer is passed through line 16 and a rotary lock 17 to be transferred for washing and filtering of the salt from the slurry. The material balance for the mixture passed through the rotary valve contains substantially all the polymer and salt introduced into the system with approximately 0.0355 pounds of steam per pound of polymer and, as stated above, approximately 0.006 pounds of NMP per pound of polymer. All the remaining steam and NMP introduced in the system has been vented through line 7 for processing and recirculation of the NMP to the reaction.

Reasonable variation and modification are possible within the scope of the foregoing disclosure, the drawing and appended claims to the invention the essence of which is that there has been provided a method and apparatus for removing polar diluent from the reaction mixture of a poly(arylene sulfide) containing arylene sulfide polymer, salt, polar dluent, and various impurities.

I claim:

1. An improved process for recovering a free flowing, lump free granular polymer substantially free of polar organic diluent and other impurities from polymer reaction slurries under conditions which substantially minimize or avoid the "pasty" physical characteristics normally encountered in separating the diluent and polymer, which comprises the steps of:
   a. producing a reaction effluent comprising a slurry of particulate poly(arylene sulfide), polar organic diluent, alkali metal halide (salt) and other impurities, which slurry is at a temperature in the range of 450° to 600°F and at a pressure in the range of 50 to 250 psig,
   b. reducing the pressure of said slurry to atmospheric by passing same through a pressure reducing mechanism in a transfer line leading to a flash zone,
   c. passing superheated steam which is at about the pressure of said slurry before pressure reduction of the slurry, through a pressure reducing mechanism which reduces the pressure thereof to atmospheric and then introducing the superheated steam into said transfer line at the point of pressure reduction and initial mixing of said slurry with said superheated steam,
   d. passing the resulting mixed stream of reaction slurry and superheated steam through said transfer line and introducing same to a flash zone wherein said mixed stream is separated into water vapor and vaporized polar organic diluent which flashes overhead and is removed from said flash zone and a bottoms slurry residue comprising particulate poly(arylene sulfide), alkali metal halide and other impurities from which about 75 to 98 percent of the polar organic diluent has been flashed,
   e. treating the flashed slurry residue substantially reduced in polar organic diluent content in at least one additional step to substantially remove residual polar organic diluent therefrom by subjecting the flashed slurry residue to agitation and countercurrent contact with steam heated to a temperature above the vaporization point of the polar organic diluent to form a vapor stream of said steam containing polar organic diluent vaporized from said flashed slurry residue which vapor stream is directed into said flash zone and removed with said vaporized polar organic diluent flashed overhead in step (d), and
   f. recovering the flashed slurry residue comprising poly(arylene sulfide) and alkali metal halide substantially depleted of polar organic diluent from step (d) and subjecting same to water washing and filtering to remove alkali metal halide therefrom leaving particulate polymer substantially free of impurities as a product of the process.

2. A process according to claim 1 wherein said polymer slurry residue obtained in step (d) is further treated to substantially remove all of the residual polar organic diluent present in the slurry residue by subjecting the flashed slurry residue in three successive treating zones to agitation and countercurrent contact with steam in each zone at a temperature above the vaporization point of the diluent to form a Vapor stream of steam and vaporized diluent in each zone and further wherein each vapor stream is returned to a previous treating zone and the total vapor stream obtained from the three treating zones is directed to the flash zone wherein the vapor stream is removed overhead along with water vapor and vaporized polar organic diluent flashed overhead in step (d).

3. A process for further treating the treated slurry residue of claim 6 which comprises slurrying the slurry residue in water which is of sufficiently elevated temperature to dissolve the alkali metal halides and other impurities and filtering the slurry to produce a filter cake of solid particulate polymer substantially freed of polar organic diluent and other impurities as a product of the process.

4. A process of claim 1 wherein the polar organic diluent is N-methyl pyrrolidone, the alkali metal is sodium chloride and the superheated steam prior to passage through said pressure reducing mechanism is at a pressure of about 200 psig and a temperature of about 450°F.

5. A process according to claim 1 in which the polar organic diluent is N-methyl pyrrolidone and the alkali metal halide is sodium chloride.

6. A process according to claim 1 wherein the reaction effluent slurry is at a pressure of about 200 psig and the superheated steam pressure is about 200 psig and the temperature is about 450°F.

7. A process according to claim 2 wherein the amount of steam in said first and second treating zones is about the same and is about 0.142 pounds of steam per pound of particulate polymer and the amount of steam in the third treating zone is about 0.007 pounds of steam per pound of particulate polymer.

8. The method of claim 1 wherein the mixture of polymer, alkali halide, residual polar organic diluent, and impurities are subjected to further treatment of countercurrent mixing with superheated high pressure steam in vessels sufficiently heated to vaporize the polar diluent and water so that the residual polar diluent is substantially removed to form a vapor stream of said steam containing polar organic diluent vaporized from said mixture which vapor stream is passed to step (c) and introduced into said flash tank and removed with said polar diluent separated in said flash tank.

* * * * *

UNITED STATES PATENT AND TRADEMARK OFFICE
CERTIFICATE OF CORRECTION

PATENT NO. : 3,956,060

DATED : May 11, 1976

INVENTOR(S) : Jack S. Scoggin

It is certified that error appears in the above—identified patent and that said Letters Patent are hereby corrected as shown below:

Column 6, line 67, "Vapor" should be ---- vapor ----

Column 7, line 8, "6" should be ---- 2 ----.

Signed and Sealed this

Thirty-first Day of August 1976

[SEAL]

Attest:

RUTH C. MASON
Attesting Officer

C. MARSHALL DANN
Commissioner of Patents and Trademarks